US011036966B2

(12) United States Patent
Tsuji

(10) Patent No.: US 11,036,966 B2
(45) Date of Patent: Jun. 15, 2021

(54) SUBJECT AREA DETECTION APPARATUS THAT EXTRACTS SUBJECT AREA FROM IMAGE, CONTROL METHOD THEREFOR, AND STORAGE MEDIUM, AS WELL AS IMAGE PICKUP APPARATUS AND DISPLAY APPARATUS

(71) Applicant: CANON KABUSHIKI KAISHA, Tokyo (JP)

(72) Inventor: Ryosuke Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 245 days.

(21) Appl. No.: 13/803,605

(22) Filed: Mar. 14, 2013

(65) Prior Publication Data
US 2013/0286217 A1 Oct. 31, 2013

(30) Foreign Application Priority Data
Apr. 26, 2012 (JP) .............................. JP2012-101249

(51) Int. Cl.
*G06K 9/00* (2006.01)
*H04N 5/232* (2006.01)

(52) U.S. Cl.
CPC ..... *G06K 9/00221* (2013.01); *H04N 5/23218* (2018.08); *H04N 5/23219* (2013.01);
(Continued)

(58) Field of Classification Search
None
See application file for complete search history.

(56) References Cited

U.S. PATENT DOCUMENTS 5,629,752 A * 5/1997 Kinjo ..................... G03B 27/80
355/35
6,940,545 B1 * 9/2005 Ray ..................... G06K 9/00234
348/222.1
(Continued)

FOREIGN PATENT DOCUMENTS

JP 10051755 A 2/1998
JP 2002-251380 A 9/2002
(Continued)

OTHER PUBLICATIONS

Chinese Office Action issued in counterpart application No. CN201310138050.1, dated Dec. 3, 2015. English translation provided.
(Continued)

*Primary Examiner* — Stefan Gadomski
(74) *Attorney, Agent, or Firm* — Rossi, Kimms & McDowell LLP

(57) ABSTRACT

A subject area detection apparatus which is capable of improving the rate of detection for a subject area in an image and detecting the subject area with ease. A first subject area which is a specific area is detected from a subject image in an image having at least one subject image. An area including at least a part of the first subject area is detected as a second subject area from the subject image in the image. An estimated area is obtained by estimating, in the second subject area, an area corresponding to the first subject area. The first subject area and the estimated area are compared with each other to obtain a correlation determination result. A subject area detection result is output according to the correlation determination result.

7 Claims, 6 Drawing Sheets

(52) U.S. Cl.
CPC ............ *G06K 2009/00328* (2013.01); *H04N 5/23212* (2013.01); *H04N 5/232127* (2018.08)

(56) References Cited

U.S. PATENT DOCUMENTS

| | | | |
|---|---|---|---|
| 7,227,976 B1* | 6/2007 | Jung | G06K 9/00228 345/419 |
| 7,263,220 B2* | 8/2007 | Crandall et al. | 382/165 |
| 7,483,548 B2* | 1/2009 | Nakano | G06K 9/00228 382/103 |
| 7,742,623 B1* | 6/2010 | Moon et al. | 382/103 |
| 7,929,042 B2* | 4/2011 | Terashima | G03B 13/00 348/345 |
| 9,094,610 B2* | 7/2015 | Yoshino | H04N 1/0035 |
| 9,224,034 B2* | 12/2015 | Steinberg | G06K 9/00228 |
| 9,360,931 B2* | 6/2016 | Sakai | G06F 3/011 |
| 2002/0191819 A1 | 12/2002 | Hashimoto et al. | 382/118 |
| 2004/0197014 A1* | 10/2004 | Oohashi | G06K 9/00221 382/118 |
| 2005/0190965 A1* | 9/2005 | Hwang | G06F 17/30793 382/165 |
| 2005/0231628 A1 | 10/2005 | Kawaguchi et al. | |
| 2006/0140455 A1* | 6/2006 | Costache | G06F 17/30259 382/118 |
| 2006/0203107 A1* | 9/2006 | Steinberg | H04N 5/232 348/239 |
| 2006/0245007 A1* | 11/2006 | Izawa et al. | 358/448 |
| 2007/0041640 A1* | 2/2007 | Tabata et al. | 382/173 |
| 2007/0076922 A1* | 4/2007 | Living et al. | 382/118 |
| 2007/0086627 A1* | 4/2007 | Kim | G06K 9/00241 382/118 |
| 2007/0247321 A1* | 10/2007 | Okamoto | G06Q 10/08 340/573.1 |
| 2008/0008361 A1* | 1/2008 | Nozaki | H04N 5/232 382/118 |
| 2008/0074529 A1* | 3/2008 | Terashima | G03B 13/00 348/345 |
| 2008/0075336 A1* | 3/2008 | Luo et al. | 382/118 |
| 2008/0158407 A1* | 7/2008 | Funamoto | G06K 9/00228 348/345 |
| 2008/0170129 A1* | 7/2008 | Yi et al. | 348/208.12 |
| 2008/0278587 A1* | 11/2008 | Izawa | G02B 7/36 348/207.11 |
| 2008/0317350 A1* | 12/2008 | Yamaguchi | G06K 9/00288 382/190 |
| 2009/0009606 A1* | 1/2009 | Takeuchi | H04N 5/23212 348/169 |
| 2009/0059021 A1* | 3/2009 | Rimon | H04N 5/23219 348/222.1 |
| 2009/0087089 A1 | 4/2009 | Hu | |
| 2009/0148006 A1* | 6/2009 | Hayasaki | G06K 9/00221 382/118 |
| 2009/0244315 A1* | 10/2009 | Miura | H04N 5/23219 348/222.1 |
| 2009/0245634 A1* | 10/2009 | Matsuzaka | G06K 9/00228 382/167 |
| 2010/0067749 A1* | 3/2010 | Kusama | G06T 1/00 382/118 |
| 2010/0141786 A1* | 6/2010 | Bigioi | G06K 9/00228 348/222.1 |
| 2010/0149369 A1* | 6/2010 | Yasuda | H04N 5/232 348/222.1 |
| 2010/0272365 A1* | 10/2010 | Yamamoto et al. | 382/190 |
| 2010/0329518 A1* | 12/2010 | Yang | G06K 9/00234 382/118 |
| 2011/0043680 A1* | 2/2011 | Uehara | 348/349 |
| 2011/0058028 A1* | 3/2011 | Sakai | G06K 9/00342 348/77 |
| 2011/0135153 A1* | 6/2011 | Tsurumi | G06K 9/00295 382/103 |
| 2011/0267489 A1* | 11/2011 | Sagawa | G06K 9/3233 348/222.1 |
| 2011/0294545 A1* | 12/2011 | Taira | G03B 15/00 455/556.1 |
| 2011/0299783 A1* | 12/2011 | Chotard et al. | 382/195 |
| 2011/0311112 A1* | 12/2011 | Matsuyama | G06K 9/00281 382/118 |
| 2012/0007975 A1* | 1/2012 | Lyons | G06K 9/00771 348/77 |
| 2012/0098992 A1* | 4/2012 | Hosoe | H04N 5/23296 348/222.1 |
| 2012/0114226 A1* | 5/2012 | Kameyama | G06K 9/00221 382/155 |
| 2012/0121129 A1* | 5/2012 | Okamoto | H04N 5/23212 382/103 |
| 2012/0140994 A1* | 6/2012 | Yamada | G06F 21/32 382/118 |
| 2012/0154661 A1* | 6/2012 | Shimada | G03B 21/14 348/333.1 |
| 2012/0200729 A1* | 8/2012 | Hoda | H04N 5/23219 348/222.1 |
| 2012/0250950 A1* | 10/2012 | Papakipos | G06F 17/30247 382/118 |
| 2013/0051677 A1* | 2/2013 | Lee | G06K 9/00771 382/192 |
| 2013/0083992 A1* | 4/2013 | Chia-Chen | 382/154 |
| 2013/0251260 A1* | 9/2013 | Aerts | G06T 7/0081 382/173 |
| 2017/0124385 A1* | 5/2017 | Ganong | G06F 17/30244 |

FOREIGN PATENT DOCUMENTS

| | | | |
|---|---|---|---|
| JP | 2005-318554 A | | 11/2005 |
| JP | 2005318551 A | | 11/2005 |
| JP | 2009048347 A | | 3/2009 |
| JP | 2009081714 A | | 4/2009 |
| JP | 2009-211311 A | | 9/2009 |
| JP | 2009223835 A | * | 10/2009 |
| JP | 2010211263 A | * | 9/2010 |
| JP | 2011205387 A | * | 10/2011 |
| KR | 20080027443 A | * | 3/2008 ....... H04N 5/232127 |

OTHER PUBLICATIONS

English translation of Official Action issued in Japanese Appln. No. 2012101249 dated Mar. 8, 2016 (JP Office Action originally submitted in Apr. 4, 2016 IDS).

Hashimoto et al. "Multi-human Tracking with Main-Parts-Link-Model Considering Postural Change", IPSJ SIG Technical Report, Information Processing Society of Japan, vol. 2011-CVIM-177 No. 19, May 19, 2011. Cited in OA dated Mar. 8, 2016 issued in counterpart Japanese Appin. No. 2012101249. Eng. abstract provided.

Official Action issued in Japanese Appin. No. 2012101249 dated Mar. 8, 2016.

* cited by examiner

FIG.4

| SUBJECT IMAGE | FACE DETECTION RESULT | HUMAN BODY DETECTION RESULT | OUTPUT |
|---|---|---|---|
| A | ○ | × | FACE DETECTION RESULT |
| B | ○ | ○ | FACE DETECTION RESULT |
| C | × | ○ | FACE AREA ESTIMATED FROM HUMAN BODY DETECTION RESULT |

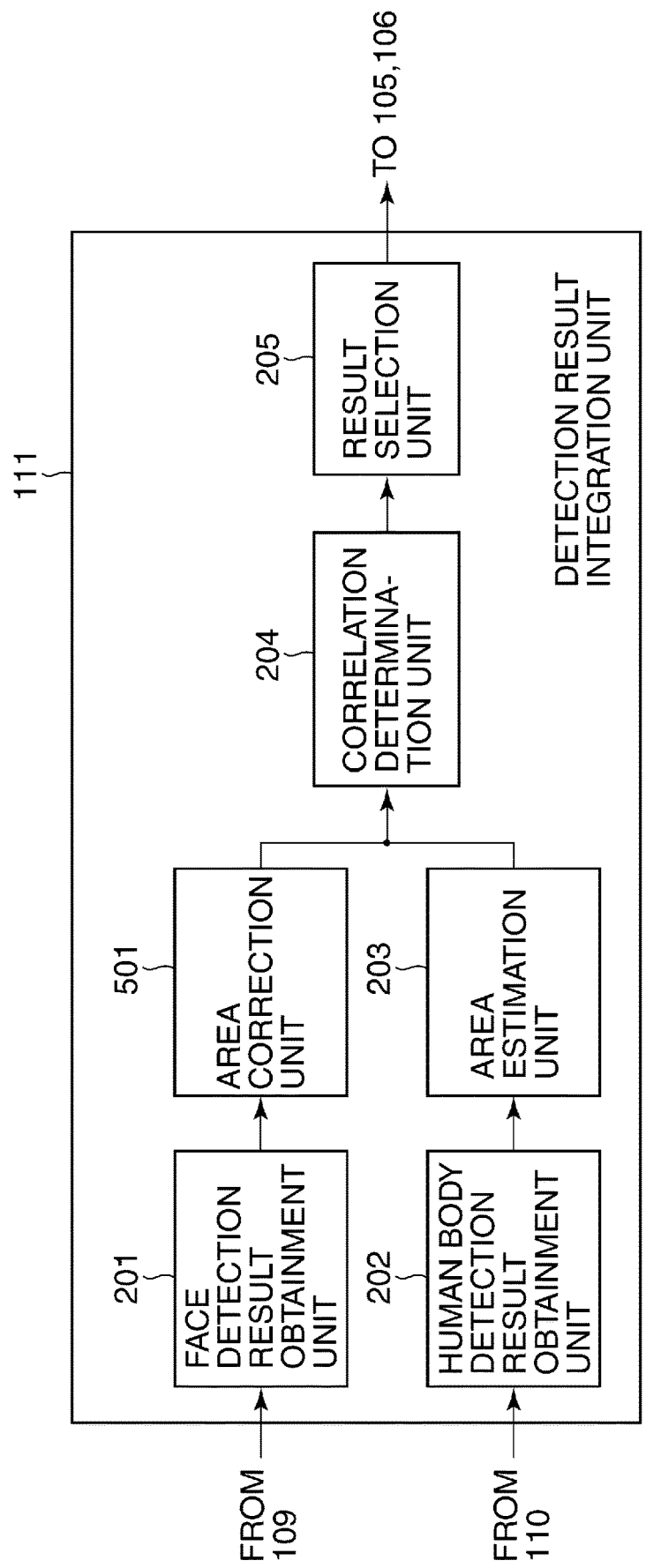

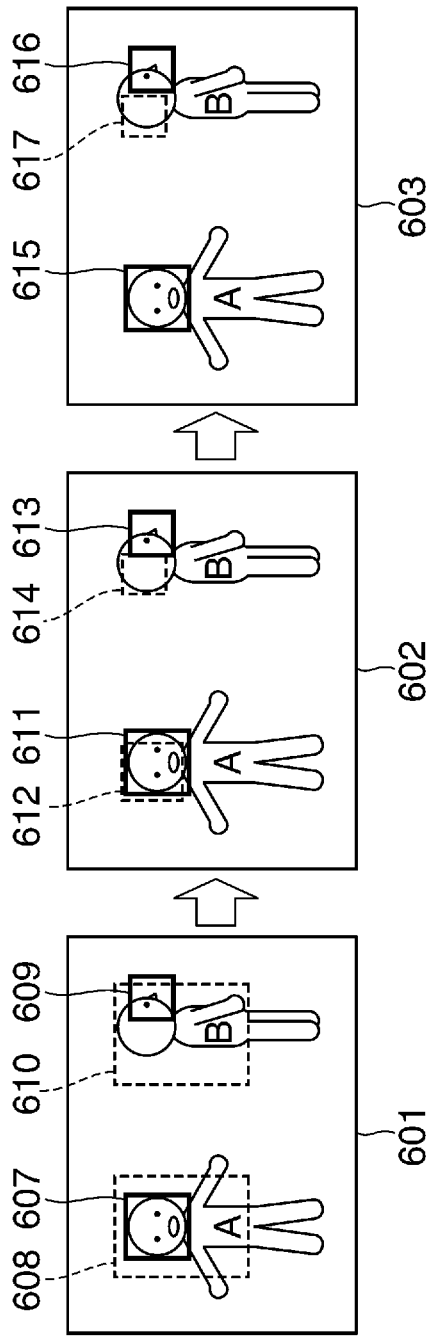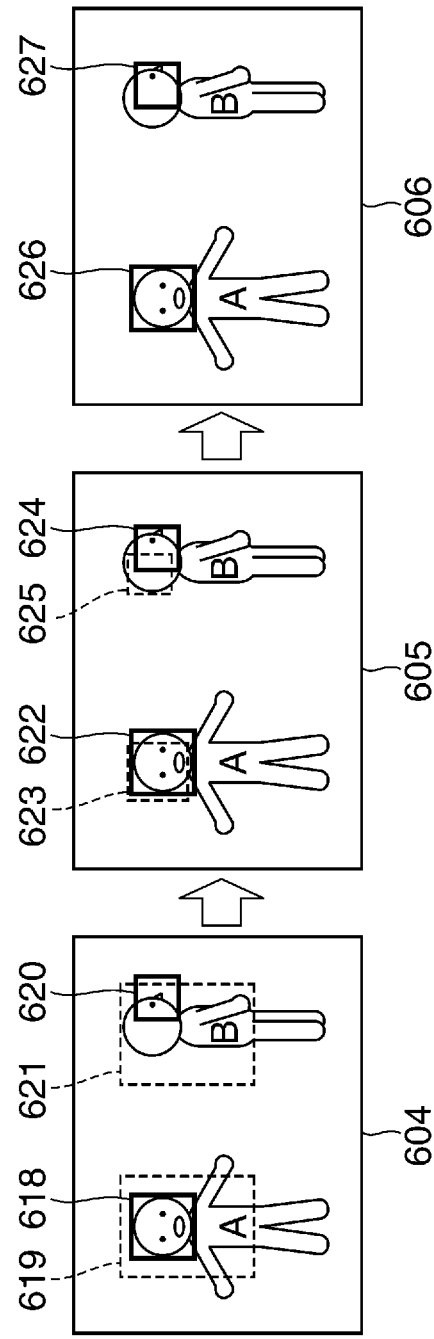

SUBJECT AREA DETECTION APPARATUS THAT EXTRACTS SUBJECT AREA FROM IMAGE, CONTROL METHOD THEREFOR, AND STORAGE MEDIUM, AS WELL AS IMAGE PICKUP APPARATUS AND DISPLAY APPARATUS

BACKGROUND OF THE INVENTION

Field of the Invention

The present invention relates to a subject area detection apparatus for extracting a subject area from an image, a control method therefor, and a computer-readable storage medium storing a control program for implementing the control method, as well as an image pickup apparatus and a display apparatus.

Description of the Related Art

In general, there is known an image processing technique for automatically detecting a specific subject pattern (for example, a human face area) from an image, and for example, this is used in many fields such as telecommunication conferences, man-machine interfaces, security, monitor systems for tracking human faces, and image compression technologies. In image pickup apparatuses such as digital cameras and digital video cameras, a specific subject area is detected from a taken image, and focus and exposure are optimized using the detection result as a controlled object.

For example, there is known a technique that detects the position of a face in an image, focuses on the detected face area, and performs shooting with an optimum exposure for the face area (see Japanese Laid-Open Patent Publication (Kokai) No. 2005-318554). There is also known an image processing apparatus that detects upper bodies of persons in an image and counts the number of persons in the image (see Japanese Laid-Open Patent Publication (Kokai) No. 2009-211311).

However, according to the technique described in Japanese Laid-Open Patent Publication (Kokai) No. 2005-318554, it is difficult to detect a face when features of the face cannot be extracted to a sufficient degree when, for example, a person faces rearward or wears an accessory on his/her face.

On the other hand, according to the technique described in Japanese Laid-Open Patent Publication (Kokai) No. 2009-211311, even when a person faces rearward or wears an accessory on his/her face, an upper body of the person can be detected, but when the person is taking a special pose or a part of an upper body area is covered up, it is difficult to detect the upper body of the person. Thus, situations where detection is possible vary according to detection techniques.

Accordingly, there may be cases where different detection techniques are used in combination so as to reduce situations where detection is difficult and improve the rate of detection. For example, for a subject whose face area could not be detected, when a human body of the subject can be detected, the face area is estimated based on the detection result on the human body. This improves face area detection rate.

However, face area detection and human body detection, which are different detection techniques, are performed independently of each other, and hence there may be cases where it cannot be determined which detection results are related to which persons. Namely, it cannot be determined whether a detection result obtained by face area detection and a detection result obtained by human body detection are detection results on the same person or detection results on different persons. As a result, it is difficult to improve the rate of detection for a face area which is one of subject areas.

SUMMARY OF THE INVENTION

The present invention provides a subject area detection apparatus which is capable of improving the rate of detection for a subject area in an image and detecting the subject area with ease, a control method therefor, and a computer-readable storage medium storing a control program for implementing the method, as well as an image pickup apparatus and a display apparatus.

Accordingly, a first aspect of the present invention provides a subject area detection apparatus that, in an image having at least one subject image, detects a specific area in the subject image as a subject area detection result, comprising a first detection unit configured to detect a first subject area which is the specific area from the subject image in the image, a second detection unit configured to detect an area including at least a part of the first subject area as a second subject area from the subject image in the image, an area estimation unit configured to obtain an estimated area by estimating, in the second subject area, an area corresponding to the first subject area, a determination unit configured to compare the first subject area and the estimated area with each other to obtain a correlation determination result, and a selection unit configured to output the subject area detection result according to the correlation determination result.

Accordingly, a second aspect of the present invention provides an image pickup apparatus comprising an image pickup unit configured to obtain an image having a subject image by taking an image of a subject, a subject area detection apparatus as described above, and a control unit configured to, according to the subject area detection result detected by the subject area detection apparatus, control image pickup conditions for use when the image pickup unit takes an image.

Accordingly, a third aspect of the present invention provides a display apparatus comprising a display unit configured to display an image having a subject image, a subject area detection apparatus as described above, and a control unit configured to, according to the subject area detection result detected by the subject area detection apparatus, display conditions for use when the display unit displays the image.

Accordingly, the fourth aspect of the present invention provides a control method for a subject are detection apparatus that, in an image having at least one subject image, detects a specific area of the subject image as a subject area detection result, comprising a first detection step of detecting a first subject area which is the specific area from the subject image in the image, a second detection step of detecting an area including at least a part of the first subject area as a second subject area from the subject image in the image, an area estimation step of obtaining an estimated area by estimating, in the second subject area, an area corresponding to the first subject area, a determination step of comparing the first subject area and the estimated area with each other to obtain a correlation determination result, and a selection step of outputting a subject area detection result according to the correlation determination result.

Accordingly, the fifth aspect of the present invention provides a non-transitory computer-readable storage medium storing a control program used by a subject area detection apparatus that, in an image having at least one subject image, detects a specific area of the subject image as a subject area detection result, the control method comprising a first detection step of detecting a first subject area which is the specific area from the subject image in the image, a second detection step of detecting an area including at least a part of the first subject area as a second subject area from the subject image in the image, and an area estimation step of obtaining an estimated area by estimating, in the second subject area, an area corresponding to the first subject area, a determination step of comparing the first subject area and the estimated area with each other to obtain a correlation determination result, and a selection step of outputting a subject area detection result according to the correlation determination result.

According to the present invention, the rate of detection for a subject area in an image is improved, and hence the subject area can be detected with ease.

Further features of the present invention will become apparent from the following description of exemplary embodiments (with reference to the attached drawings).

BRIEF DESCRIPTION OF THE DRAWINGS

FIG. 4 is a view showing selection results (outputs) from a result selection unit for taken images appearing in FIG. 3.

FIG. 5 is a block diagram schematically showing an arrangement of an exemplary detection result integration unit according to a second embodiment of the present invention.

FIGS. 6A and 6B are views useful in explaining a process carried out by the detection result integration unit appearing in FIG. 5, in which FIG. 6A is a view showing, for comparison, a process carried out by the detection result integration unit appearing in FIG. 5, and FIG. 6B is a view showing a process carried out by the detection result integration unit appearing in FIG. 5.

DESCRIPTION OF THE EMBODIMENTS

A description will now be given of an exemplary image pickup apparatus having a subject area detection apparatus according to embodiments of the present invention with reference to the drawings. It should be noted that in the following description, a human face area which is one of subject areas is taken as an example.

Figure 1:
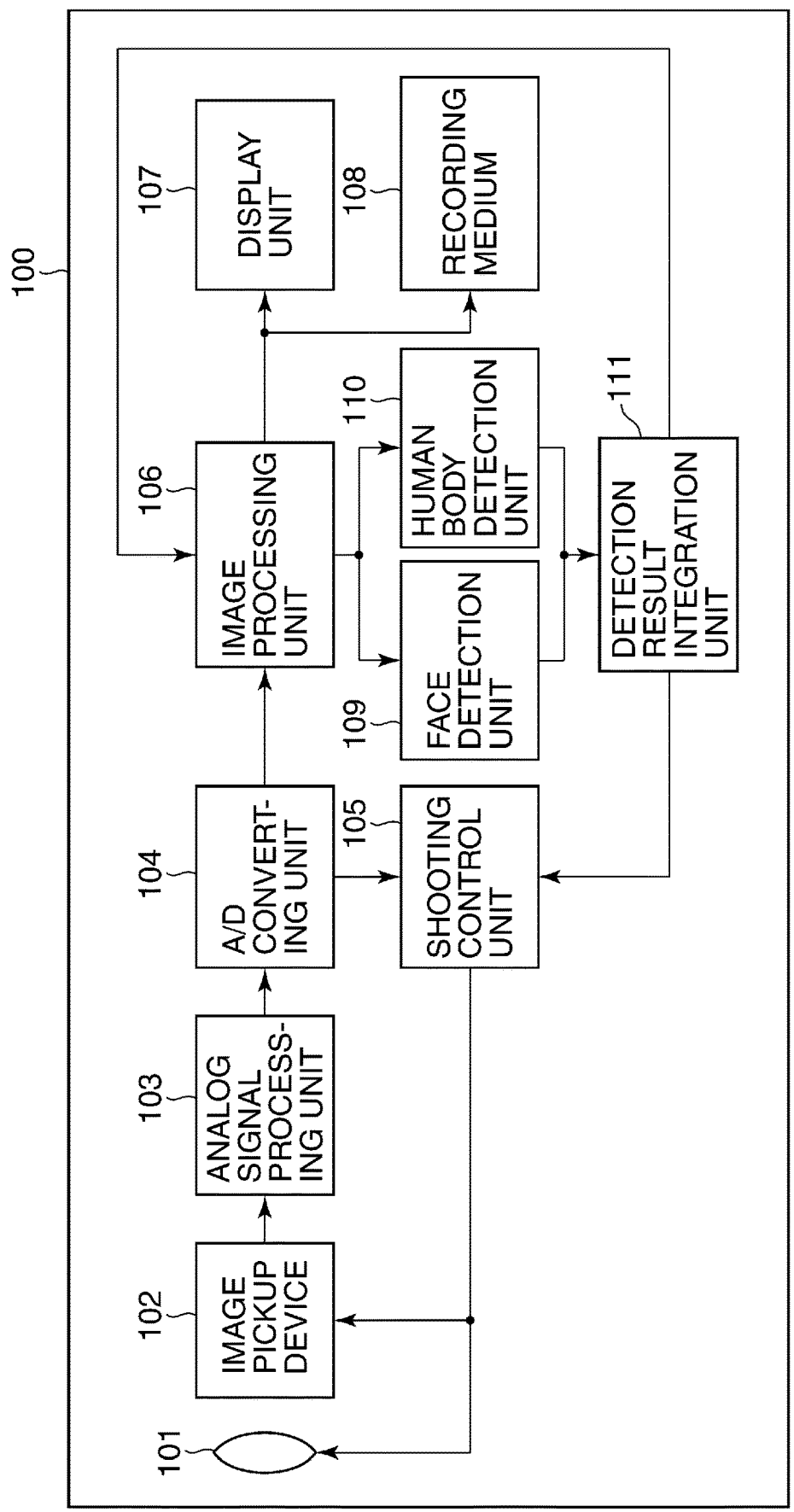
FIG. 1 is a block diagram schematically showing an arrangement of an exemplary image pickup apparatus having a subject area detection apparatus according to a first embodiment of the present invention.

FIG. 1 is a block diagram schematically showing an arrangement of an exemplary image pickup apparatus having a subject area detection apparatus according to a first embodiment of the present invention.

The image pickup apparatus 100 shown in the figure is, for example, a digital camera (hereafter referred to as "the camera"), and the camera 100 has a face detection unit 109 and a human body detection unit 110. The face detection unit 109 detects a face area of a person which is an object to be detected, and the human body detection unit 110 detects a human body area of a person.

The camera 100 also has an image pickup lens unit 101, and an optical image (subject image) converged by the image pickup lens unit 101 is formed on an image pickup device 102. The image pickup device 102 is, for example, a CCD image sensor or a CMOS image sensor. The image pickup device 102 outputs an electric signal (analog signal: image signal) corresponding to an optical image. The analog signal is supplied to an analog signal processing unit 103, which in turn subjects the analog signal to analog signal processing such as correlated double sampling (CDS).

An image signal output from the analog signal processing unit 103 is converted into a digital signal by an A/D converting unit 104. This digital signal is then input to a shooting control unit 105 and an image processing unit 106.

The shooting control unit 105 (control unit), which is, for example, a CPU or a microcontroller, controls the overall operation of the image pickup apparatus 100. The shooting control unit 105 expands programs, which are stored in a built-in ROM, in a work area of a built-in RAM and executes the same to control components of the image pickup apparatus 100.

The image processing unit 106 subjects a digital signal (digital image signal) to image processing such as gamma correction and white balance. It should be noted that the image processing unit 106 also has a function of performing image processing using information on a specific subject area in an image (subject information) supplied from a detection result integration unit 111, to be described later, as well as the image processing mentioned above.

A processed image signal output from the image processing unit 106 is sent to a display unit 107. The display unit 107, which is, for example, an LCD or an organic electroluminescent (EL) display, displays an image screen according to the processed image signal.

The camera 100 shown in the figure causes the display unit 107 to display images, which are successively taken in chronological order by the image pickup device 102, so that the display unit 107 can act as an electronic viewfinder (EVF). Also, for example, a position of a subject area extracted by the detection result integration unit 111, to be described later, is displayed on the display unit 107.

A processed image signal output from the image processing unit 106 is also recorded in a recording medium 108, for example, a removable memory card. It should be noted that as a destination at which the processed image signal is recorded, a built-in memory (not shown) provided in the camera 100 may be used, and further, an external apparatus (not shown) connected to the camera 100 by a communication interface (not shown) may be used.

A processed image signal output from the image processing unit 106 is also supplied to a face detection unit 109 (first detection unit). The face detection unit 109 detects a specific subject image in an image, which is represented by the processed image signal, to identify a subject area (first subject area). Here, a face area of a human image is identified as the subject area. When a plurality of persons are present in the image, the face detection unit 109 detects face areas corresponding in number to the number of persons.

Exemplary detection techniques used by the face detection unit 109 include a technique using face-related knowledge (for example, skin color information and parts such as eyes, nose, and mouth) and a technique using a learning algorithm typified by a neural network to construct an identification function for face detection. Also, in general, face recognition is performed using a plurality of techniques in combination so as to improve recognition rate in the face detection. Specifically, there is a method in which a face is detected using wavelet conversion and image feature amounts as described in Japanese Laid-Open Patent Publication (Kokai) No. 2002-251380. A face detection result obtained by the face detection unit 109 is sent to the detection result integration unit 111.

A processed image signal output from the image processing unit 106 is also supplied to the human body detection unit 110 (second detection unit). The human body detection unit 110 detects an upper body area of a human body (second subject area), from an image which is represented by the processed image signal, as a subject area. When a plurality of persons are present in the image, the human body detection unit 110 detects upper-body areas corresponding in number to the number of persons.

Exemplary detection techniques used by the human body detection unit 110 include a technique described in Japanese Laid-Open Patent Publication (Kokai) No. 2009-211311. Here, an edge intensity of a local upper body contour is detected as a local feature amount. As techniques to extract a feature amount from an image, there are known techniques using the Sobel filter, the Prewitt filter, or the Haar filter. According to an extracted local feature amount, the human body detection unit 110 discriminates between an upper body and a lower body using a human discrimination unit.

Discrimination by the human discrimination unit is done by mechanical learning such as AdaBoost learning. An upper body detection result (also referred to as a human body detection result) obtained by the human body detection unit 110 is supplied to the detection result integration unit 111.

Based on a face detection result and an upper body detection result, the detection result integration unit 111 integrates the face detection result and the upper body detection result on the same subject together as will be described later to obtain an integrated detection result. The detection result integration unit 111 then outputs the integrated detection result as a subject area detection result to the shooting control unit 105 and the image processing unit 106. A description will be given later of how the detection result integration unit 111 works.

The shooting control unit 105 controls the image pickup lens unit 101 to control shooting conditions such as a focusing state and an exposure state at the time of shooting. Specifically, based on a digital image signal output from the A/D converting unit 104, the shooting control unit 105 controls a focus control mechanism and an exposure control mechanism (neither of them are shown) provided in the image pickup lens unit 101. For example, the focus control mechanism is an actuator that drives an image pickup lens, which is provided in the image pickup lens unit 101, in a direction of an optical axis, and the exposure control mechanism is an actuator that drives a diaphragm and a shutter provided in the image pickup lens unit 101.

When controlling the focus control mechanism and the exposure control mechanism, the shooting control unit 105 uses an integrated detection result sent from the detection result integration unit 111. Specifically, the shooting control unit 105 controls focus using a contrast value of a subject area indicated by the integrated detection result and controls exposure using a luminance value of the subject area.

Thus, the camera 100 shown in the figure is able to carry out an image pickup process with consideration given to a specific subject area in an image obtained as a result of image pickup. Moreover, the shooting control unit 105 controls readout timing of the image pickup device 102 and controls readout such as readout of pixels.

Figure 2:
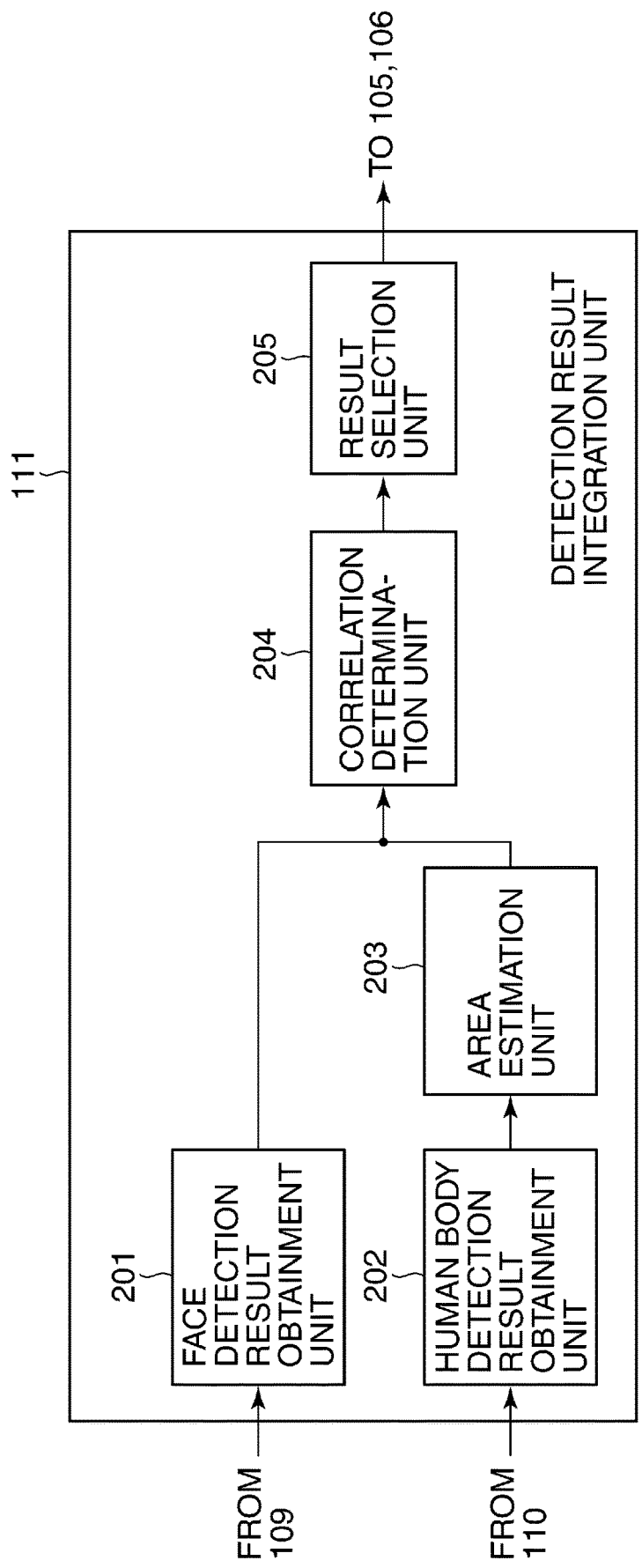
FIG. 2 is a block diagram schematically showing an arrangement of an example of a detection result integration unit appearing in FIG. 1.

FIG. 2 is a block diagram schematically showing an arrangement of an example of the detection result integration unit 111 appearing in FIG. 1.

The detection result integration unit 111 has a face detection result obtainment unit 201, a human body detection result obtainment unit 202, an area estimation unit 203 (area estimation unit), a correlation determination unit 204 (determination unit), and a result selection unit 205 (selection unit). The face detection result obtainment unit 201 obtains a face detection result from the face detection unit 109. Here, the face detection result includes the number of detected persons, positions and sizes of face areas in the respective persons in an image, the reliability of the detection result, and so on. The human body detection result obtainment unit 202 obtains a human body detection result from the human body detection unit 110. The human body detection result includes the number of detected persons, positions and sizes of upper-body areas in the respective persons in an image, the reliability of the detection result, and so on.

The area estimation unit 203 obtains a human body detection result from the human body detection result obtainment unit 202, and based on the human body detection result, estimates a partial area corresponding to a detection area (that is, a face area) obtained by the face detection unit 109, and outputs an estimation result (also referred to as an estimated area). Exemplary techniques for estimation by the area estimation unit 203 include estimation through linear transformation based on the relationship in detection area between the face detection unit 109 and the human body detection unit 110.

The correlation determination unit 204 receives a face detection result from the face detection result obtainment unit 201 and also receives an estimation result from the area estimation unit 203. The correlation determination unit 204 determines the degree of similarity in position and size, that is, the degree of correlation between face areas indicated by the face detection result and the estimation result. The correlation determination unit 204 outputs a correlation determination result indicating that the face detection result and the estimation result (that is, a human body detection result) are detection results relating to the same subject.

The result selection unit 205 is supplied with the face detection result, the estimation result, and the correlation determination result from the correlation determination unit 204. Based on the correlation determination result, the result selection unit 205 selects one of the face detection result and the estimation result. For example, when the correlation determination unit 204 determines that there is a similarity (there is a correlation), the result selection unit 205 outputs the face detection result as an integrated detection result. On the other hand, when the correlation determination unit 204 determines that there is no similarity (there is no correlation), the result selection unit 205 outputs the estimation result as an integrated detection result.

Thus, the detection result integration unit 111 integrates a face detection result obtained by the face detection unit 109 and a human body detection result obtained by the human body detection unit 110 together according to whether or not they are detection results on the same subject, and outputs a face area (or a partial area) as a detection result.

Figure 3:
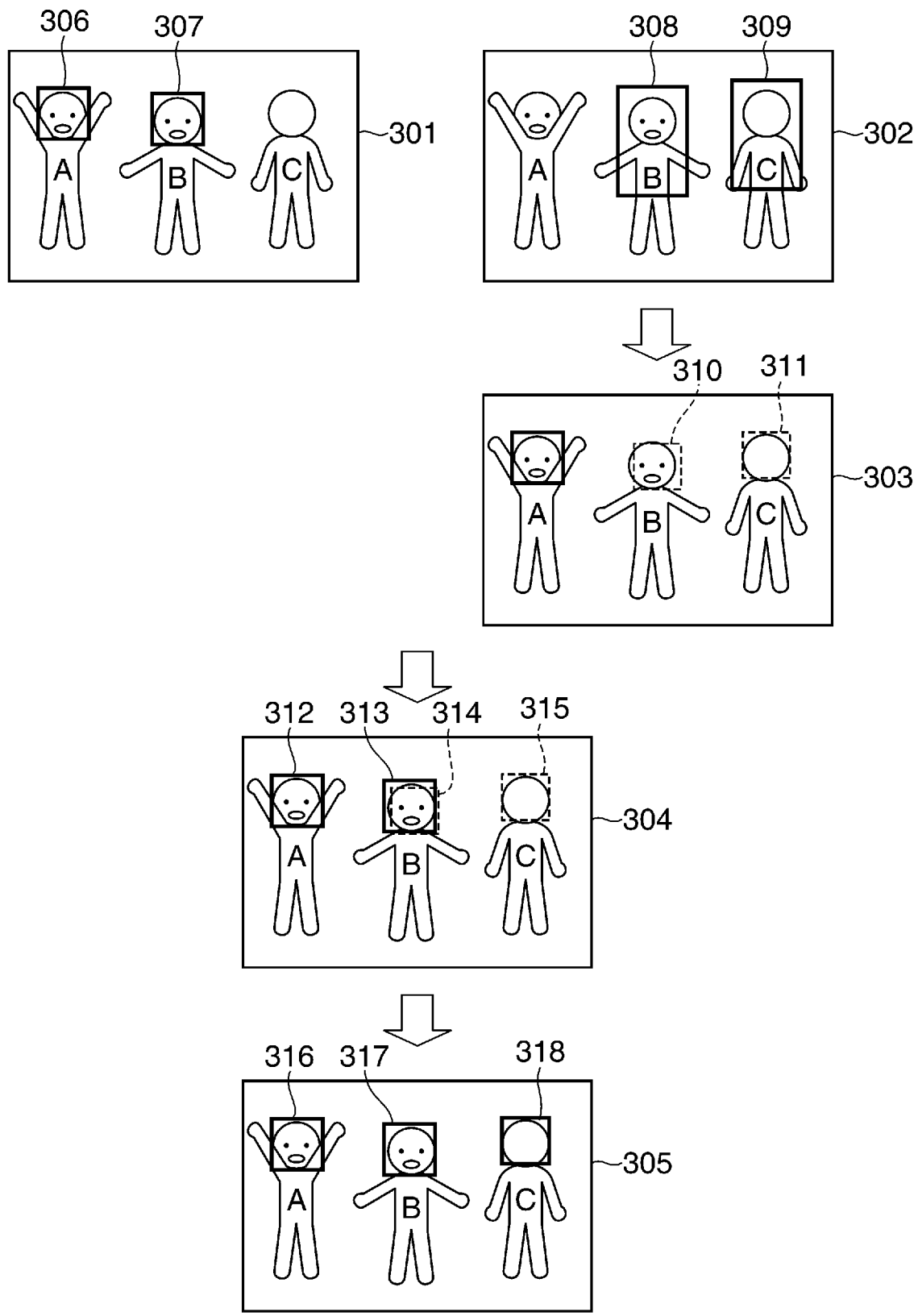
FIG. 3 is a view useful in explaining a process carried out by the detection result integration unit appearing in FIG. 2.

FIG. 3 is a view useful in explaining a process carried out by the detection result integration unit 111 appearing in FIG. 2.

Referring to FIG. 3, taken images 301 to 305 are those taken at the same time. In the taken images 301 to 305, there are a subject image A, a subject image B, and a subject image C.

In the taken image 301, face areas are detected in the subject images A and B, and the face areas are surrounded with respective solid-line rectangular frames 306 and 307.

The taken image 301 shows a face detection result, and the face detection result obtainment unit 201 described with reference to FIG. 2 obtains the taken image 301 as a face detection result.

It should be noted that in the taken image 301, the subject image C faces rearward, and hence no face area is detected in it.

In the taken image 302, upper body areas (human body areas) are detected in the subject images B and C, and the upper body areas are surrounded with respective solid-line rectangular frames 308 and 309. The taken image 302 shows a human body detection result, and the human body detection result obtainment unit 202 described above with reference to FIG. 2 obtains the taken image 302 as a human body detection result.

It should be noted that in the taken image 302, no upper body area is detected in the subject image A because both arms are up close to a face, that is, due to the effect of a posture.

The taken image 303 shows an estimation result obtained by the area estimation unit 203 appearing in FIG. 2. Namely, the area estimation unit 203 estimates a partial area corresponding to a face area from the taken image 302 (that is, the human body detection result). In the taken image 303, partial areas (that is, face areas) are estimated in the subject images B and C, and the partial areas are surrounded with respective broken-line rectangular frames 301 and 311.

The taken image 304 shows a correlation determination process carried out by the correlation determination unit 204 appearing in FIG. 2. In the taken image 304, solid-line rectangular frames 312 and 313 correspond to the solid-line rectangular frames 306 and 307, respectively, in the taken image 301. Broken-line rectangular frames 314 and 315 correspond to the broken-line rectangular frames 310 and 311, respectively, in the taken image 303.

For the taken image 304, with respect to the subject image B in which there are both the solid-line rectangular frame 313 and the broken-line rectangular frames 314, the correlation determination unit 204 determines areas (sizes and shapes) of the solid-line rectangular frame 313 and the broken-line rectangular frames 314 and position coordinates thereof and obtains the degree of similarity between them.

When the degree of similarity is equal to or greater than a predetermined threshold value (greater than 0 and smaller than 1), the correlation determination unit 204 determines that the solid-line rectangular frame 313 and the broken-line rectangular frames 314 are detection results indicative of a face area in the same subject image. On the other hand, when the degree of similarity is smaller than the predetermined threshold value, the correlation determination unit 204 determines that the solid-line rectangular frame 313 and the broken-line rectangular frames 314 are detection results indicative of face areas in different subject images. The correlation determination unit 204 then outputs the taken image 304 and the correlation determination result to the result selection unit 205.

It should be noted that because there is only the solid-line rectangular frame 312 in the subject image A, and there is only the broken-line rectangular frame 315 in the subject image C, the correlation determination unit 204 determines that the degree of similarity is zero. Namely, the correlation determination unit 204 determines that there is no correlation.

The taken image 305 shows an integrated detection result output from the result selection unit 205 appearing in FIG. 2. Here, a solid-line rectangular frame 316 corresponds to the solid-line rectangular frame 312 in the taken image 304, and a solid-line rectangular frame 317 corresponds to the solid-line rectangular frame 313 in the taken image 304. A solid-line rectangular frame 318 corresponds to the broken-line rectangular frame 315 in the taken image 304.

When there is only a face detection result in a case where a correlation determination result on a subject image is indicative of no correlation, the result selection unit 205 selects the face detection result. Thus, for the subject image A, the result selection unit 205 selects the solid-line rectangular frame 312, which is a face detection result, and adds the solid-line rectangular frames 316 to the subject image A in the taken image 305.

When there is only an estimation result (estimated area) in a case where a correlation determination result on a subject image is indicative of no correlation, the result selection unit 205 selects the estimation result. Thus, for the subject image C, the result selection unit 205 selects the broken-line rectangular frame 315, which is an estimation result, and adds the solid-line rectangular frames 318 to the subject image C in the taken image 305.

When a correlation determination result on a subject image is indicative of a correlation being present, the result selection unit 205 selects a face detection result. Namely, when a correlation determination result indicates that both a face area and an estimated area are areas in the same subject image, the result selection unit 205 outputs the face area as a subject area detection result. Thus, for the subject image B, the result selection unit 205 selects the solid-line rectangular frame 313, which is a face detection result, and adds the solid-line rectangular frame 317 to the subject image B in the taken image 305.

FIG. 4 is a view showing selection results (outputs) from the result selection unit 205 for the taken images appearing in FIG. 3.

Referring to FIG. 4, as for the subject images A and B, there are face detection results, and hence the result selection unit 205 outputs the face detection results. As for the subject image C, there is only a human body detection result, and hence the result selection unit 205 outputs an estimation result obtained by estimating a face area from the human body detection result. Thus, in the taken image 305 appearing in FIG. 3, the solid-line rectangular frames 316 and 317 are added as face detection results to the subject images A and B, and the solid-line rectangular frame 318 is added as an estimation result to the subject image C.

It should be noted that as described earlier, the face detection result obtainment unit 201 and the human body detection result obtainment unit 202 obtain degrees of reliability indicative of certainties of a face detection result and a human body detection result, respectively. In the above description, based on a correction determination result obtained by the correlation determination unit 204, the result selection unit 205 outputs a face detection result for a subject in which there is a face detection result, but for a subject in which there are both a face detection result and a human body detection result, the result selection unit 205 may output one with a higher degree of reliability.

As described above, according to the first embodiment, because there are two detection units such as a face detection unit and a human body detection unit which detect areas covering each other, and a detection result to be output is selected according to two detection results on the same subject, the rate of detection for a targeted subject can be improved. As a result, a subject can be detected even when, for example, a person faces rearward, wears an accessory on his/her face, takes an arbitrary position, or has an upper body area covered up.

A description will now be given of a subject area detection apparatus according to a second embodiment of the present invention. It should be noted that an arrangement of an image pickup apparatus according to the second embodiment is similar to that of the image pickup apparatus appearing in FIG. 1, but the image pickup apparatus according to the second embodiment differs from the image pickup apparatus appearing in FIG. 1 in terms of an arrangement of the detection result integration unit and functions of the face detection unit 109.

In the second embodiment, the face detection unit 109 outputs, as a face detection result, head pose information indicative of a head pose as well as positions and sizes of face areas in respective persons in an image and the reliability of the detection result. For example, the face detection unit 109 performs face detection using a plurality of identification devices according to head poses such as a frontal face and a side face and obtains head pose information by determining an identification device that has detected a face area.

FIG. 5 is a block diagram schematically showing an arrangement of an example of the detection result integration unit 111 according to the second embodiment of the present invention. It should be noted that in FIG. 5, the same component elements as those appearing in FIG. 2 are denoted by the same reference numerals, and description thereof is omitted.

Referring to FIG. 5, the detection result integration unit 111 further has an area correction unit 501 (correction unit). The area correction unit 501 receives a face detection result from the face detection result obtainment unit 201. The area correction unit 501 corrects positions and sizes of face areas in the face detection result based on head pose information to obtain a corrected face detection result. The area correction unit 501 then supplies the corrected face detection result to the correlation determination unit 204.

FIGS. 6A and 6B are views useful in explaining a process carried out by the detection result integration unit 111 appearing in FIG. 5. FIG. 6A is a view showing, for comparison, a process carried out by the detection result integration unit 111 appearing in FIG. 5, and FIG. 6B is a view showing a process carried out by the detection result integration unit 111 appearing in FIG. 5.

Referring to FIGS. 6A and 6B, taken images 601 to 606 are those taken at the same time. In the taken images 601 to 606, there are a subject image A and a subject image B.

Referring first to FIG. 6A, in the taken image 601, face areas are detected in the subject images A and B, and the face areas are surrounded with respective solid-line rectangular frames 607 and 609. The solid-line rectangular frames 607 and 609 represent face detection results, and these face detection results are obtained by the face detection result obtainment unit 201.

In the subject images A and B, upper body areas (human body areas) are detected, and the upper body areas are surrounded with respective broken-line rectangular frames 608 and 610. The broken-line rectangular frames 608 and 610 represent human body detection results, and these human body detection results are obtained by the human body detection result obtainment unit 202.

The face detection unit 109 detects, for example, a face area with a central focus on eyes. For this reason, when a face is turned sideways as in the subject image B, the solid-line rectangular frame 609 does not match the face area.

The taken image 602 shows a correlation determination process carried out by the correlation determination unit 204 appearing in FIG. 2. In the taken image 602, solid-line rectangular frames 611 and 613 represent face detection results, and broken-line rectangular frames 612 and 614 represent estimation results obtained by the area estimation unit 203 appearing in FIG. 2. Here, the solid-line rectangular frame 613 and the broken-line rectangular frame 614 are greatly misaligned, and hence the correction determination unit 204 determines that there is no correlation because the degree of similarity is smaller than a predetermined threshold value. Namely, it is determined that the face detection result represented by the solid-line rectangular frame 613 and the estimation result represented by the broken-line rectangular frame 614 are detection results on different subject images although they are detection results on the same subject image B.

The taken image 603 shows an integrated detection result output from the result selection unit 205 appearing in FIG. 2. Here, a solid-line rectangular frame 615 corresponds to the solid-line rectangular frame 611 in the taken image 602, and a solid-line rectangular frame 616 corresponds to the solid-line rectangular frame 613 in the taken image 602. A broken-line rectangular frame 617 corresponds to the broken-line rectangular frame 614.

Here, for the subject image A, it is determined that there is a correlation between the solid-line rectangular frame 611 and the broken-line rectangular frame 612, and thus, for the subject image A, the result selection unit 205 selects the solid-line rectangular frame 611, which is a face detection result, and adds the solid-line rectangular frames 615 to the subject image A in the taken image 603.

On the other hand, for the subject image B, it is determined that there is no correlation between the solid-line rectangular frame 613 and the broken-line rectangular frame 614 (it is determined that they are determined as being different subject images), and thus, in this case, the result selection unit 205 selects the solid-line rectangular frame 613, which is a face detection result, and the broken-line rectangular frame 614. As a result, the result selection unit 205 adds the solid-line rectangular frame 616 and the broken-line rectangular frame 617 to the same subject image B.

Thus, when a face is turned sideways in a subject image, a face area represented by a face detection result and a face area represented by an estimation result are greatly misaligned, and it is determined that there is no correlation. As a result, rectangular frames which are two face area detection frames are displayed in the same subject image.

Referring next to FIG. 6B, in the taken image 604, face areas are detected in the subject images A and B, and the face areas are surrounded with respective solid-line rectangular frames 618 and 620. The solid-line rectangular frames 618 and 620 represent face detection results, and these face detection results are obtained by the face detection result obtainment unit 201.

In the subject images A and B, upper body areas (human body areas) are detected, and the upper body areas are surrounded with respective broken-line rectangular frames 619 and 621. The broken-line rectangular frames 619 and 621 represent human body detection results, and these human body detection results are obtained by the human body detection result obtainment unit 202.

The taken image 605 shows a correlation determination process carried out by the correlation determination unit 204 appearing in FIG. 5. In the taken image 605, solid-line rectangular frames 622 and 624 represent corrected face detection results corrected by the area correction unit 501 appearing in FIG. 5, and broken-line rectangular frames 623 and 625 represent estimation results obtained by the area estimation unit 203 appearing in FIG. 5.

When a face is turned sideways, the area correction unit 501 corrects a face detection area, which is a face detection result, according to the degree to which the face is turned sideways. Because the solid-line rectangular frame 622 is a face detection result on the subject image A, and the head of the subject image A faces front, the area correction unit 501 does not perform correction. Therefore, the solid-line rectangular frame 622 and the solid-line rectangular frame 618 are the same areas.

On the other hand, because the solid-line rectangular frame 624 is a face detection result on the subject image B, and a face is turned sideways in the subject image B, the area correction unit 501 corrects a face area, which is a face detection result, according to the degree to which the face is turned sideways. Therefore, the solid-line rectangular frame 624 and the solid-line rectangular frame 620 are different areas. In the taken image 605, the solid-line rectangular frame 624 are shifted to the left as viewed in the figure from the solid-line rectangular frame 613 in the taken image 602 and surrounds the face area of the subject B.

Here, the solid-line rectangular frame 624 and the broken-line rectangular frame 625 are misaligned to a small degree and overlap each other in many places. Thus, the correlation determination unit 204 determines that the degree of similarity is equal to or greater than a predetermined threshold value and thus there is a correlation. Namely, the correlation determination unit 204 determines that the face detection result represented by the solid-line rectangular frame 624 and the estimation result represented by the broken-line rectangular frame 625 are detection results on the same subject image B.

The taken image 606 shows an integrated detection result output from the result selection unit 205 appearing in FIG. 5. Here, a solid-line rectangular frame 626 corresponds to the solid-line rectangular frame 622 in the taken image 605, and a solid-line rectangular frame 627 corresponds to the solid-line rectangular frame 624 in the taken image 605.

Here, for the subject image A, it is determined that there is a correlation between the solid-line rectangular frame 622 and the broken-line rectangular frame 623, and thus, for the subject image A, the result selection unit 205 selects the solid-line rectangular frame 622, which is a face detection result, and adds the solid-line rectangular frame 626 to the subject image A in the taken image 606.

Likewise, for the subject image B, it is determined that there is a correlation between the solid-line rectangular frame 624 and the broken-line rectangular frame 625, and thus, for the subject image B, the result selection unit 205 selects the solid-line rectangular frame 624, which is a face detection result, and adds the solid-line rectangular frame 627 to the subject image B.

Thus, according to the second embodiment of the present invention, head pose information is obtained at the time of face detection, and based on the head pose information, face areas indicated by face detection results are corrected. This can improve the accuracy of correlation determination and appropriately detect face areas.

As described above, according to the embodiments of the present invention, the rate of detection for subject areas in an image can be improved, and subject areas can be detected with ease.

As is apparent from the above description, in the example shown in FIG. 1, the image pickup lens unit 101, the image pickup device 102, the analog signal processing unit 103, and the A/D converting unit 104 act as an image pickup unit.

Although in the first and second embodiments described above, a subject area detection apparatus that detects subject areas is applied to an image pickup apparatus, an apparatus to which the subject area detection apparatus is applied is not limited to an image pickup apparatus. For example, the subject area detection apparatus may be applied to a display apparatus that displays image data (reproduced data), which is supplied from an external apparatus, a recording medium, or the like, as an image.

This display apparatus targets reproduced data from which subject areas are detected. On this occasion, a control unit such as a microcontroller provided in the display apparatus controls display conditions for use in displaying an image based on information on subject images (such as positions and sizes of subject images in an image) obtained as a result of the subject area detection process described above.

Specifically, luminance, tone, etc. of an image to be displayed are controlled according to whether or not symbols indicative of subject images such as rectangular frames are superposed on subject images in an image, or according to luminances of or color information on subject images.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-101249 filed Apr. 26, 2012, which is hereby incorporated by reference herein in its entirety.

What is claimed is:

1. A subject area detection apparatus, comprising:
at least one non-transitory memory device;
at least one processor;
a first detection unit configured to detect a face area of a human subject in an image;
a second detection unit configured to detect a body area of a human subject in the image, the body area detected by the second detection unit including a portion of a human body that is not included in the face area detected by the first detection unit;
an area estimation unit configured to estimate a face area based on the body area detected by the second detection unit, the estimated face area estimated by the area estimation unit being different from the face area detected by the first detection unit;
a determination unit configured to compare the face area detected by the first detection unit and the estimated face area estimated by the area estimation unit with each other to determine whether the face area detected by the first detection unit and the estimated face area estimated by the area estimation unit are related to the same human subject based on at least positions of the face area detected by the first detection unit and the estimated face area estimated by the area estimation unit in the image; and a selection unit configured to (i) select and output information relating to the face area detected by the first detection unit with respect to the human subject in the image, in response to the determination unit determining that the face area detected by the first detection unit and the estimated face area estimated by the area estimation unit are related to the same human subject, and (ii) select and output information relating to the estimated face area estimated by the area estimation unit with respect to the human subject in the image in response to the determination unit determining that the face area detected by the first detection unit and the estimated face area estimated by the area estimation unit are not related to the same human subject, wherein the first detection unit, the second detection unit, the area estimation unit, the determination unit, and the selection unit are implemented by the at least one processor executing at least one program recorded on the at least one non-transitory memory device.

2. The subject area detection apparatus according to claim 1, wherein the determination unit determines that the face area detected by the first detection unit and the estimated face area estimated by the area estimation unit are related to the same human subject based on shapes of the face area detected by the first detection unit and the estimated face area estimated by the area estimation unit and positions of the face area detected by the first detection unit and the estimated face area estimated by the area estimation unit in the image.

3. The subject area detection apparatus according to claim 1, wherein for the face area detected by the first detection unit and the estimated face area estimated by the area estimation unit, the determination unit obtains a degree of similarity between the face area detected by the first detection unit and the estimated face area estimated by the area estimation unit based on positions and sizes of subject areas in the image, and determines that the face area detected by the first detection unit and the estimated face area estimated by the area estimation unit are related to the same human subject according to the degree of similarity and a predetermined threshold value.

4. The subject area detection apparatus according to claim 3, wherein in a case where the degree of similarity is equal to or greater than the threshold value, the determination unit determines that the face area detected by the first detection unit and the estimated face area estimated by the area estimation unit are related to the same human subject.

5. The subject area detection apparatus according to claim 1, wherein:

in detecting the face area, the first detection unit obtains head pose information on a pose of the face area relative to front, the subject area detection apparatus further comprises a correction unit configured to correct the face area detected by the first detection unit based on the head pose information, and the determination unit determines that the face area detected by the first detection unit and the estimated face area estimated by the area estimation unit are related to the same human subject using the face area corrected by the correction unit, wherein the correction unit is implemented by the at least one processor executing at least one program recorded on the at least one non-transitory memory device.

6. An image pickup apparatus comprising:

an image pickup device configured to obtain an image having at least one human subject;

a subject area detection apparatus; and a controller configured to, according to a detection result detected by the subject area detection apparatus, control image pickup conditions for use when the image pickup device takes an image, wherein the subject area detection apparatus comprises:

at least one non-transitory memory device;

at least one processor;

a first detection unit configured to detect a face area of a human subject in the image;

a second detection unit configured to detect a body area of a human subject in the image, the body area detected by the second detection unit including a portion of a human body that is not included in the face area detected by the first detection unit;

an area estimation unit configured to estimate a face area based on the body area detected by the second detection unit, the estimated face area estimated by the area estimation unit being different from the face area detected by the first detection unit;

a determination unit configured to compare the face area detected by the first detection unit and the estimated face area estimated by the area estimation unit with each other to determine that whether the face area detected by the first detection unit and the estimated face area estimated by the area estimation unit are related to the same human subject based on at least positions of the face area detected by the first detection unit and the estimated face area estimated by the area estimation unit in the image; and a selection unit configured to select and output information relating to the face area detected by the first detection unit with respect to the human subject in the image, in response to the determination unit determining that the face area detected by the first detection unit and the estimated face area estimated by the area estimation unit are related to the same human subject, and (ii) select and output information relating to the estimated face area estimated by the area estimation unit with respect to the human subject in the image in response to the determination unit determining that the face area detected by the first detection unit and the estimated face area estimated by the area estimation unit are not related to the same human subject, wherein the first detection unit, the second detection unit, the area estimation unit, the determination unit, and the selection unit are implemented by the at least one processor executing at least one program recorded on the at least one non-transitory memory device.

7. A control method for a subject area detection apparatus, the method comprising:

detecting a face area of a human subject in an image;

detecting a body area of a human subject in the image, the detected body area including a portion of a human body that is not included in the detected face area;

estimating a face area based on the detected body area, the estimated face area being different from the detected face area;

comparing the detected face area and the estimated face area with each other to determine that whether the detected face area and the estimated face area are related to the same human subject based on at least positions of the detected face area and the estimated face area in the image; and selecting and outputting information relating to the detected face area with respect to the human subject in the image, in response to a determination that the detected face area and the estimated face area are related to the same human subject, and selecting and outputting information relating to the estimated face area with respect to the human subject in the image in response to a determination that the detected face area and the estimated face area are not related to the same human subject.

* * * * *